US010099586B2

(12) United States Patent
Ito (10) Patent No.: US 10,099,586 B2
(45) Date of Patent: Oct. 16, 2018

(54) FIXING STRUCTURE FOR SURFACE SKIN, AND VEHICLE SEAT (71) Applicant: TACHI-S CO., LTD., Akishima-shi, Tokyo (JP)

(72) Inventor: Yasuyuki Ito, Akishima (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 3 days.

(21) Appl. No.: 15/308,985

(22) PCT Filed: May 11, 2015

(86) PCT No.: PCT/JP2015/063480
§ 371 (c)(1),
(2) Date: Nov. 4, 2016

(87) PCT Pub. No.: WO2016/031308
PCT Pub. Date: Mar. 3, 2016

(65) Prior Publication Data
US 2017/0066357 A1  Mar. 9, 2017

(30) Foreign Application Priority Data

Aug. 26, 2014  (JP) ................. 2014-171427

(51) Int. Cl.
A47C 27/00 (2006.01)
A47C 31/00 (2006.01)
(Continued)

(52) U.S. Cl.
CPC ................ *B60N 2/72* (2013.01); *A47C 31/02* (2013.01); *A47C 31/023* (2013.01); *B60N 2/20* (2013.01);
(Continued)

(58) Field of Classification Search
CPC .......... B60N 2/72; B60N 2/20; B60N 2/4802; B60N 2/5825; B60N 2/5841;
(Continued)

(56) References Cited

FOREIGN PATENT DOCUMENTS

GB  2 240 920 A  8/1991
GB  2 333 261 A  7/1999
(Continued)

OTHER PUBLICATIONS

International Search Report (ISR) (PCT Form PCT/ISA/210), in PCT/JP2015/063480, dated Jul. 14, 2015.
(Continued)

*Primary Examiner* — Mark R Wendell
(74) *Attorney, Agent, or Firm* — McGinn J.P. Law Group, PLLC.

(57) ABSTRACT

Provided is an inexpensive fixing structure for a surface skin, an operation by which is simple. A fixing structure for a surface skin, the fixing structure being used for fixing to a core 17 a surface skin 14 having an opening 22, wherein the surface skin 14 in at least the portion in which the opening 22 is formed is formed of a soft material, the opening 22 is formed by an edge part 14c of the surface skin 14, a groove 20 is formed in the core 17, and the surface skin 14 is fixed to the core 17 by the edge part 14c of the surface skin 14 being inserted into the groove 20. Since the surface skin 14 is fixed to the core 17 merely by inserting the edge part 14c of the surface skin 14 into the groove 20 in the core 17, a simple operation is realized. Since there is no need to provide the edge part 14c of the surface skin 14 with an attachment device, the fixing structure for the surface skin 14 is inexpensive.

20 Claims, 6 Drawing Sheets (51) Int. Cl.
*B60N 2/72* (2006.01)
*A47C 31/02* (2006.01)
*B68G 7/05* (2006.01)
*B60N 2/20* (2006.01)
*B60N 2/68* (2006.01)
*B60N 2/58* (2006.01)
*B60N 2/60* (2006.01)

(52) U.S. Cl.
CPC ......... *B60N 2/5825* (2013.01); *B60N 2/5841* (2013.01); *B60N 2/5883* (2013.01); *B60N 2/6009* (2013.01); *B60N 2/688* (2013.01); *B68G 7/05* (2013.01)

(58) Field of Classification Search
CPC .... B60N 2/5883; B60N 2/6009; B60N 2/688; A47C 31/02; A47C 31/023; B68G 7/05

USPC ...................................................... 297/218.5
See application file for complete search history.

(56) References Cited

FOREIGN PATENT DOCUMENTS

| | | |
|---|---|---|
| GB | 2 337 694 A | 12/1999 |
| JP | S63-124900 U | 8/1988 |
| JP | H04-067562 U | 6/1992 |
| JP | H10-295485 A | 11/1998 |
| JP | 2005-306129 A | 11/2005 |

OTHER PUBLICATIONS

Supplementary European Search Report dated Jun. 28, 2017 in European Application No. 15 83 6803.

FIXING STRUCTURE FOR SURFACE SKIN, AND VEHICLE SEAT

TECHNICAL FIELD

The present invention relates to a fixing structure for a surface skin, the fixing structure being used for fixing a surface skin formed of skin, natural or synthetic leather, a textile, or the like to a counterpart member. The present invention also relates to a vehicle seat installed in an automobile or other vehicle.

BACKGROUND ART

Conventionally, there have been known fixing structures for a surface skin such as that disclosed in Patent Literature 1 (Japanese Unexamined Patent Application Publication No. 2005-306129). This fixing structure for a surface skin is applied to seat backs as vehicle seats. Specifically, a trim plate is fixed to a seat back frame, and a pad is mounted on the seat back frame. A plastic hook is attached to the edge part of an opening (i.e., hole) in a pouch-form surface skin, and the plastic hook is hooked onto the rim of an opening in the trim plate. Hooking the plastic hook fixes the surface skin to the trim plate (and, therefore, to the seat back frame).

CITATION LIST

Patent Literature

Patent Literature 1: Japanese Unexamined Patent Application Publication No. 2005-306129

SUMMARY OF INVENTION

Technical Problem

In the conventional fixing structure for a surface skin described above, the plastic hook must be attached to the edge part of the opening in the surface skin, necessitating component costs for preparing the plastic hook and manufacturing costs for attaching the plastic hook to the surface skin, thus posing a problem in that increased expense is presented. An additional problem is presented in that the operation for hooking the plastic hook onto the trim plate is difficult.

In view of the problems described above in conventional apparatuses, it is an objective of the present invention to provide an inexpensive fixing structure for a surface skin, an operation by which is simple, and to provide an inexpensive vehicle seat, an operation in which is simple.

Solution to Problems

A fixing structure for a surface skin according to the present invention is used for fixing to a counterpart member a surface skin having an opening, wherein: the surface skin in at least the portion in which the opening is formed is formed of a soft material; the opening is formed by an edge part of the surface skin; a groove is formed in the counterpart member; and the surface skin is fixed to the counterpart member by the edge part of the surface skin being inserted into the groove.

Conventionally, a plastic hook is attached to the edge part of an opening in the surface skin, and a dedicated fitting structure used for anchoring the surface skin is furthermore provided. By hooking the plastic hook onto the fitting structure, the surface skin is fixed to the counterpart member. In this conventional technique, the structure increases in complexity commensurately with respect to the provision of the plastic hook and the dedicated fitting structure used for fitting with the plastic hook, the number of components increases, and the expense increases.

In contrast, in the present invention, since the surface skin is anchored by inserting the edge part of the surface skin into a groove formed in the counterpart member, the need for a plastic hook and a dedicated fitting structure used for fitting with the plastic hook is eliminated; therefore, it is possible to simplify the structure of the fixing structure for a surface skin, reduce the number of components in the fixing structure for a surface skin, and lower the cost of the fixing structure for a surface skin.

Additionally, it is possible to fix the surface skin comprising a soft material to the counterpart member merely by performing a very simple operation for inserting the edge part of the surface skin into the groove in the counterpart member.

In the fixing structure for a surface skin according to the present invention, it is desirable for the edge part of the surface skin to be inserted into the groove while being elastically deformed. This makes it possible to strengthen the fitting between the edge part and the groove.

In the fixing structure for a surface skin according to the present invention, the counterpart member may be a rigid skeletal structure or a member integrated with the rigid skeletal structure. Examples of the skeletal structure include a metal frame or a synthetic-resin frame both installed in the interior of a vehicle seat, and a member integrally joined to those frames.

In the fixing structure for a surface skin according to the present invention, the soft material forming the surface skin may be an elastomer, a soft plastic, a molded non-woven fabric, a stitchable synthetic resin, an equivalent of these, or a combination of these. According to this configuration, the edge part of the surface skin can readily be inserted into the groove in the counterpart member, and the edge part of the surface skin can be configured so as to not readily fall out once the edge part has been inserted into the interior of the groove. In particular, when the soft material has a shape-retention property, the operation for inserting the edge part of the surface skin into the groove in the counterpart member is greatly simplified.

In the fixing structure for a surface skin according to the present invention, it is desirable for the surface skin to be thicker at the edge part than in portions other than the edge part. This makes it possible to increase the strength of the portion where the surface skin and counterpart member are joined.

Next, the vehicle seat according to the present invention comprising a frame, a pad supported by the frame, a surface skin covering the pad, and a fixing structure for a surface skin, wherein the fixing structure for fixing the surface skin to the frame are fixing structures that are configured as described above. In this vehicle seat, the frame functions as a counterpart member. By "frame" is meant a member that actually functions as a frame and a member integrated with the frame; e.g., a member of broad definition including cores, brackets, garnishes, and the like.

In the present invention, since the surface skin is anchored by inserting the edge part of the surface skin into a groove formed in the frame serving as a counterpart member, the need for a plastic hook and a dedicated fitting structure used for fitting with the plastic hook is eliminated; therefore, it is possible to simplify the structure of the vehicle seat, reduce the number of components in the vehicle seat, and lower the cost of the vehicle seat.

Additionally, it is possible to fix the surface skin comprising a soft material to the counterpart member merely by performing a very simple operation for inserting the edge part of the surface skin into the groove in the counterpart member.

Advantageous Effects of Invention

In the fixing structure for a surface skin according to the present invention, since the surface skin is anchored by inserting the edge part of the surface skin into a groove formed in the counterpart member for securing a surface skin, the need for a plastic hook and a dedicated fitting structure used for fitting with the plastic hook is eliminated; therefore, it is possible to simplify the structure of the fixing structure for a surface skin, reduce the number of components in the fixing structure for a surface skin, and lower the cost of the fixing structure for a surface skin. Additionally, it is possible to fix the surface skin comprising a soft material to the counterpart member merely by performing a very simple operation for inserting the edge part of the surface skin into the groove in the counterpart member.

In the vehicle seat according to the present invention, since the surface skin is anchored by inserting the edge part of the surface skin into a groove formed in the frame serving as a counterpart member, the need for a plastic hook and a dedicated fitting structure used for fitting with the plastic hook is eliminated; therefore, it is possible to simplify the structure of the vehicle seat, reduce the number of components in the vehicle seat, and lower the cost of the vehicle seat. Additionally, it is possible to fix the surface skin comprising a soft material to the counterpart member merely by performing a very simple operation for inserting the edge part of the surface skin into the groove in the counterpart member.

DESCRIPTION OF EMBODIMENTS

The fixing structure for a surface skin, and the vehicle seat, according to the present invention will be described below on the basis of embodiments. It shall be apparent that the present invention is not limited to these embodiments. Additionally, there shall be cases in which structural elements in the drawings annexed to the present specification are illustrated using proportions different from those in actual use, in order to facilitate understanding of the characteristic portions.

First Embodiment of Vehicle Seat and Fixing Structure for Surface Skin

Figure 1:
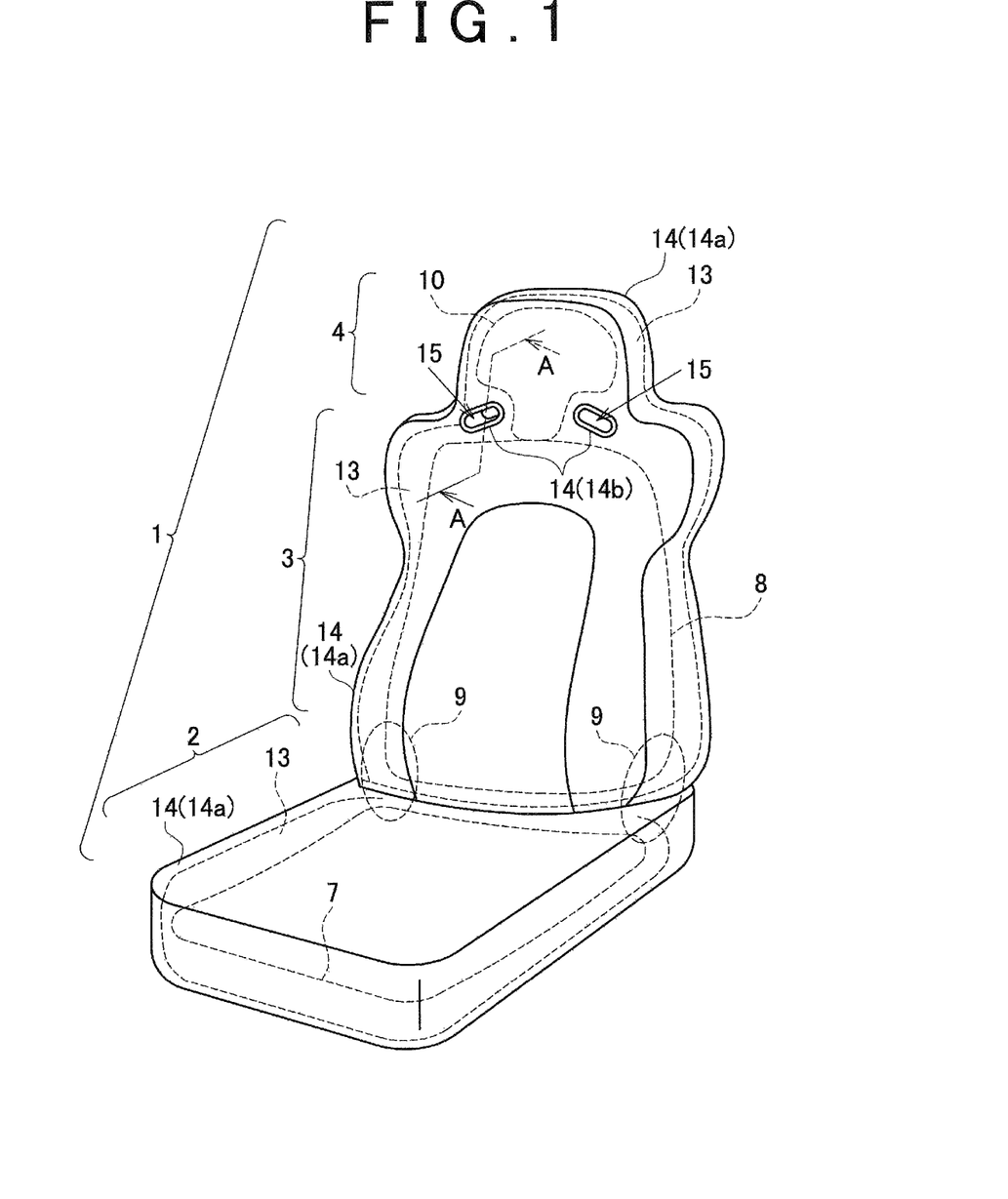
FIG. 1 is a perspective view illustrating an embodiment of a vehicle seat comprising a fixing structure for a surface skin according to the present invention.

FIG. 1 illustrates an embodiment of a vehicle seat according to the present invention. In FIG. 1, the vehicle seat 1 has a seat cushion 2 for a person to place their buttocks thereon, a seat back 3 for a person to rest their back thereagainst, and a headrest 4 for a person to rest their head thereagainst. The seat back 3 and the headrest 4 are formed integrally.

The seat cushion 2 internally has a seat cushion frame 7, which is a skeletal structure. The seat back 3 internally has a seat back frame 8, which is a skeletal structure. The seat cushion frame 7 and the seat back frame 8 are rotatably connected to each other by hinge brackets 9, 9 at two lateral locations.

The headrest 4 internally has a headrest frame 10, which is a skeletal structure. The headrest frame 10 is welded or otherwise fixed to the upper part of the seat back frame 8. The seat cushion frame 7, seat back frame 8, and headrest frame 10 are covered by pads 13. The pads 13 are covered by a surface skin 14.

A substantial portion 14a of the surface skin 14 is formed of skin, natural or synthetic leather, a textile, or the like. Seatbelt passage holes 15, 15 are provided at two lateral positions at a boundary portion between the seat back 3 and the headrest 4. Portions 14b of the surface skin 14 in the periphery of the seatbelt passage holes 15 are formed of a soft material. The soft material is described in detail further below.

Figure 2:
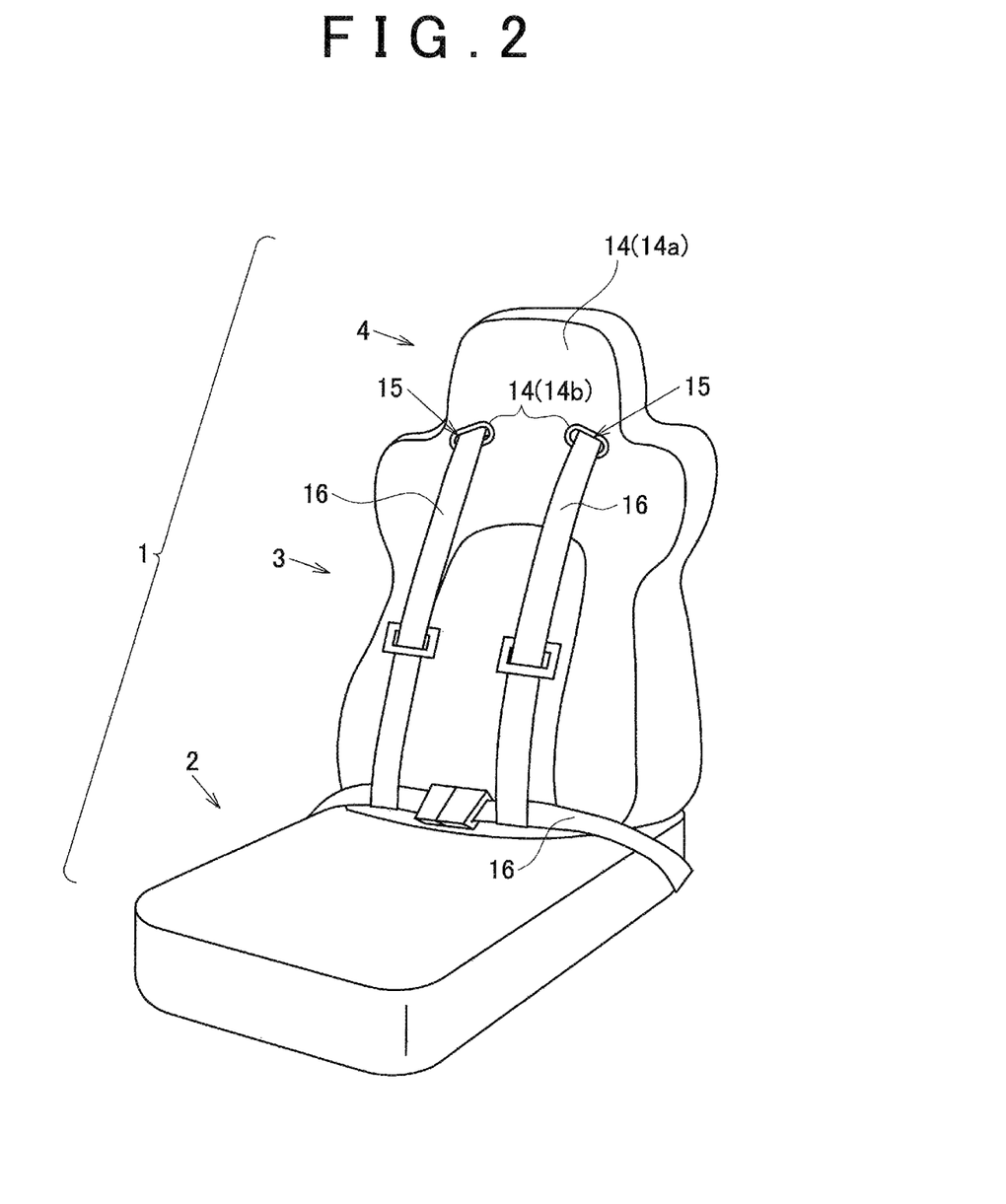
FIG. 2 is a perspective view illustrating one usage form of the vehicle seat of FIG. 1.

The seatbelt passage holes 15, 15 pass through from the front surface of the seat back 3 to the rear surface thereof. As illustrated in FIG. 1, the seatbelt passage holes 15, 15 are formed in an ellipsoidal shape or an ovaloid shape (namely, rectangle with both ends rounded), when viewed from the front. As illustrated in FIG. 2, seatbelts 16, 16 extend from the front surface of the seat back 3 to the rear surface thereof through the seatbelt passage holes 15, 15.

Figure 3:
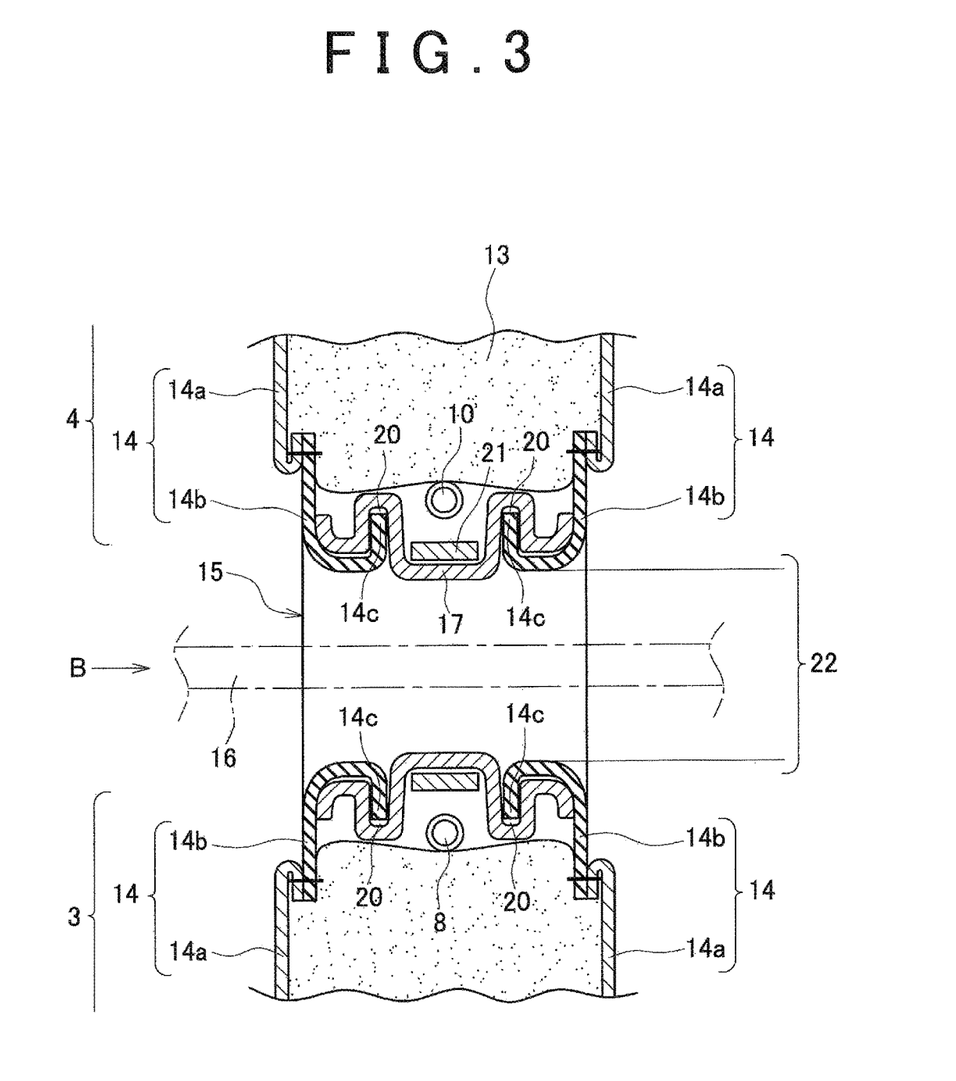
FIG. 3 is a cross-sectional view illustrating an embodiment of the fixing structure for a surface skin used in the vehicle seat of FIG. 1.
Figure 4:
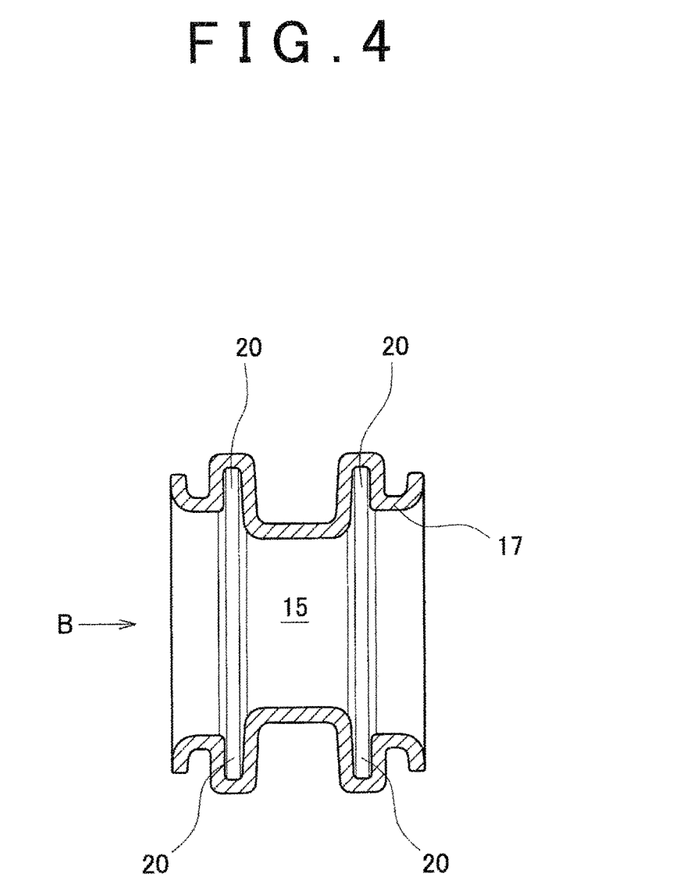
FIG. 4 is front view illustrating the cross-sectional structure of a core used in FIG. 3.

FIG. 3 illustrates the cross-sectional structure of a seatbelt passage hole 15 along line A-A in FIG. 1. In FIG. 3, the seatbelt passage hole 15 is formed by a core 17. The core 17 is formed of a hard synthetic resin. The hole 15 is of ellipsoidal shape or ovaloid shape as viewed from the direction of arrow B in FIG. 4. Two annular grooves 20 are formed in the periphery of intermediate portions of a tubular part forming the hole 15.

In FIG. 3, the pad 13 is formed of foamed urethane that is a cushion material comprising an elastic material. The pad 13 is formed by a foam molding process using, e.g., urethane as the material, the pad 13 being formed so as to cover the headrest frame 10 and the seat back frame 8. During the foam molding process, a cylindrical bracket 21 formed of metal or a hard synthetic resin is arranged at a prescribed position within the pad 13. The core 17 is supported by the bracket 21. The material forming the pad 13 and the method for processing the same, described here, are not limited to the portion illustrated in FIG. 3, but rather are also applied in relation to all of the pads 13 in the vehicle seat 1 of FIG. 1.

The surface skin 14 has a first surface skin 14a that is a substantial portion of the surface skin 14 of FIG. 1, and a second surface skin 14b that is a portion arranged in the periphery of the seatbelt passage holes 15. The first surface skin 14a is formed of skin, natural or synthetic leather, a textile, or the like. The second surface skin 14b is formed of a soft material. Examples of the soft material include elastomers, soft plastics, molded non-woven fabrics, stitchable synthetic resins, an equivalent of these, or a combination of these. The elastomers are rubber-form elastic industrial materials. The soft material has a property whereby a prescribed shape is retained in its natural state; i.e., a shape-retention property. In FIG. 3, the first surface skin 14a and the second surface skin 14b are stitched, bonded, or otherwise joined together.

In FIG. 3, an edge part 14c of the tip of the second surface skin 14b constitutes a bent shape in a curved state. The second surface skin 14b retains this bent shape in its natural state. An opening 22 is formed in the surface skin 14 by the edge part 14c. The opening 22 is of ellipsoidal shape or ovaloid shape as viewed from the direction of arrow B (forward direction).

The opening 22 exposes the seatbelt passage hole 15 to the exterior. The first surface skin 14a constituting the surface skin 14 covers most of the vehicle seat 1, as illustrated in FIG. 1. The edge part 14c of the second surface skin 14b by which the opening 22 of the surface skin 14 is formed is inserted into the annular groove 20 in the core 17 in FIG. 3.

The thickness of the edge part 14c is slightly greater than the width of the groove 20. Since the second surface skin 14b is formed of a soft material having a shape-retention property, when the edge part 14c is to be inserted into the groove 20, force is applied to the edge part 14c and the edge part 14c is inserted into the groove 20 while the edge part 14c is elastically deformed in the direction of compression of the edge part 14c. The edge part 14c inserted into the groove 20 presses against the side-wall surface of the groove 20 due to elastic restoring force. Therefore, the edge part 14c does not readily fall out of the groove 20. Thus, in the present embodiment, the surface skin 14 is fixed to the core 17, which serves as a counterpart member integrated with the frames 8, 10, by the edge part 14c of the tip of the surface skin 14 being inserted into the groove 20 provided in the core 17, which is the counterpart member. Specifically, in the present embodiment, the fixing structure for the surface skin 14 is configured from the groove 20 in the core 17 and the edge part 14c of the surface skin 14.

Thus, since the groove 20 is formed in the core 17, which is a counterpart member for fixing the surface skin 14, and since the surface skin 14 is anchored by inserting the edge part 14c of the surface skin 14 into the groove 20, the need for a plastic hook and a dedicated fitting structure used for fitting with the plastic hook is eliminated; therefore, it is possible to simplify the structure of the fixing structure for a surface skin, reduce the number of components in the fixing structure for a surface skin, and lower the cost of the fixing structure for a surface skin.

Additionally, it is possible to fix the surface skin 14 comprising a soft material to the core 17 merely by performing a very simple operation for inserting the edge part 14c of the surface skin 14 into the groove 20 in the core 17, which is a counterpart member.

Second Embodiment of Vehicle Seat and Fixing Structure for Surface Skin

Figure 5:
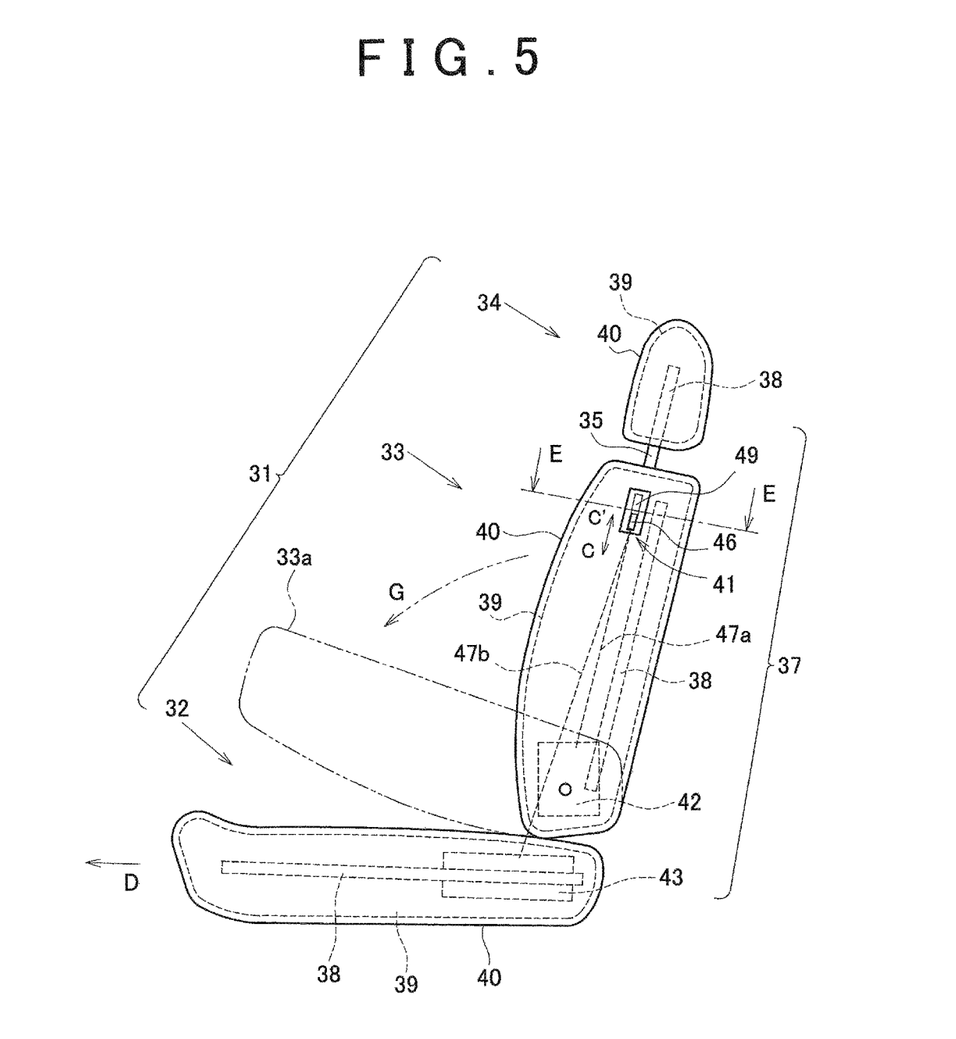
FIG. 5 is a side view illustrating another embodiment of a vehicle seat comprising a fixing structure for a surface skin according to the present invention.

FIG. 5 illustrates another embodiment of the vehicle seat according to the present invention. In FIG. 5, the vehicle seat 31 has a seat cushion 32, a seat back 33, and a headrest 34. The seat back 33 and the headrest 34 are formed separately. The headrest 34 has a rod 35. The rod 35 is inserted into the upper surface of the seat back 33, whereby the headrest 34 is attached to the upper part of the seat back 33.

Each of the seat cushion 32, the seat back 33, and the headrest 34 has a frame 38, which is a skeletal structure, a pad 39 for covering the frame 38, and a surface skin 40 for covering the pad 39.

The vehicle seat 31 comprises a walk-in device 37. In the present embodiment, the walk-in device 37 has a manipulation unit 41 provided to the upper part of the seat back 33, a reclining device 42 provided to the lower part of the seat back 33, and a seat adjuster 43 provided to the rear part of the seat cushion 32.

The manipulation unit 41 has a manipulation lever 46. The manipulation lever 46 is capable of sliding in the vertical direction illustrated by arrows C-C'. The manipulation lever 46 is urged in the downward direction illustrated by arrow C by an elastic member such as a spring. The manipulation lever 46 is linked to the reclining device 42 through a control wire 47a. The manipulation lever 46 is additionally linked to the seat adjuster 43 through a control wire 47b.

When the manipulation lever 46 is caused to move in the upward direction illustrated by arrow C' against the spring force, the control wire 47a is pulled and the reclining device 42 is unlocked. The unlocking causes the seat back 33 to lean forward as illustrated by arrow G and chain line 33a. Additionally, when the manipulation lever 46 is caused to move upward as illustrated by arrow C', the control wire 47b is pulled and the seat adjuster 43 is unlocked. The unlocking causes the seat cushion 32 to slide forward as illustrated by arrow D.

The forward leaning movement of the seat back 33 and the forward sliding movement of the seat cushion 32 described above open a broad space upward and rearward from the vehicle seat 31. It is possible for a passenger to easily enter (i.e., walk into) the space rearward of the vehicle seat 31 through the space opened in this manner.

Figure 6:
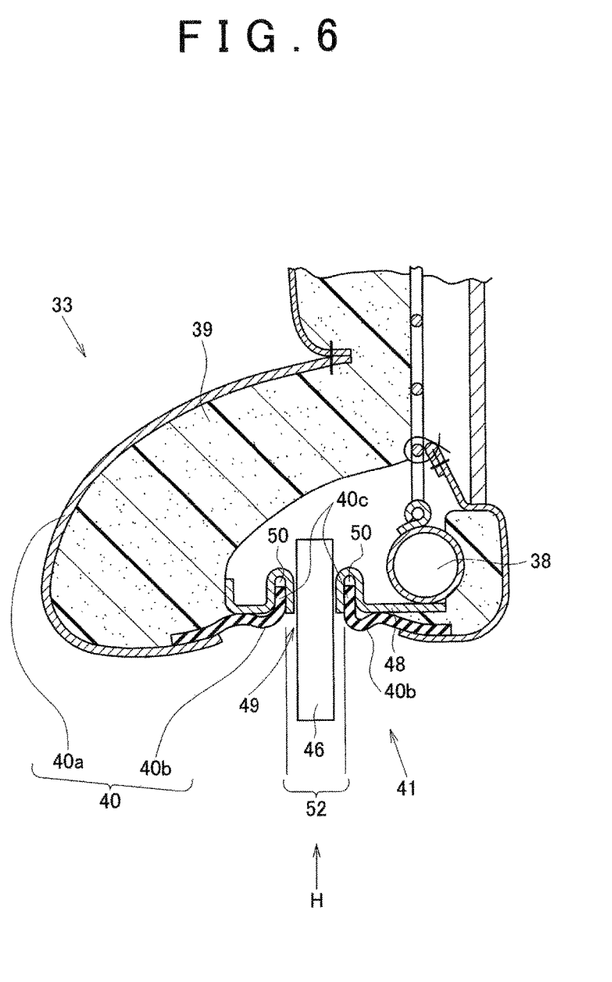
FIG. 6 is a cross-sectional view illustrating the planar cross-sectional structure of a walk-in device, taken along line E-E in FIG. 5.

FIG. 6 illustrates the planar cross-sectional structure of the manipulation device 41, taken along line E-E in FIG. 5. In FIG. 6, a panel 48 serving as a counterpart member is fixed to the frame 38 provided within the seat back 33. The panel 48 is formed of a hard synthetic resin. The panel 48 has formed therein an elongated hole 49 that is elongated along the vertical direction (the direction perpendicular to the plane of the diagram depicted by FIG. 6; i.e., the direction of arrows C-C' in FIG. 5), the manipulation lever 46 being inserted into the elongated hole 49. The manipulation lever 46 is capable of moving in parallel in the vertical direction illustrated by arrows C-C' in FIG. 5, along the elongated hole 49 in panel 48. Grooves 50 are formed, in an annular shape as viewed from the direction of arrow H, on the peripheral edge of the tip of the panel 48 in which the elongated hole 49 is formed.

In FIG. 6, the pad 39 is formed of foamed urethane that is a cushion material comprising an elastic material. The pad 39 is formed by a foam molding process using, e.g., urethane as the material, the pad 39 being formed so as to cover the frame 38. The panel 48 is fixed to the frame 38 prior to the process for foam-molding the pad 39.

The surface skin 40 has a first surface skin 40a that is a substantial portion of the surface skin 40 in FIG. 5, and a second surface skin 40b that is a portion arranged in the periphery of the elongated hole 49 in the panel 48. The first surface skin 40a is formed of skin, natural or synthetic leather, a textile, or the like. The second surface skin 40b is formed of a soft material. Examples of the soft material include elastomers, soft plastics, molded non-woven fabrics, stitchable synthetic resins, an equivalent of these, or a combination of these. The elastomers are rubber-form elastic industrial materials. The soft material has a property whereby a prescribed shape is retained in its natural state; i.e., a shape-retention property. The first surface skin 40a and the second surface skin 40b are stitched, bonded, or otherwise joined together.

An edge part 40c of the tip of the second surface skin 40b constitutes a bent shape in a curved state, as illustrated in FIG. 6. An opening 52 is formed in the surface skin 40 by the edge part 40c. The opening 52 exposes the elongated hole 49 in the panel 49 to the exterior. The first surface skin 40a constituting the surface skin 40 covers most of the vehicle seat 31, as illustrated in FIG. 5. Meanwhile, the edge part 40c of the second surface skin 40b by which the opening 52 of the surface skin 40 is formed in FIG. 6 is inserted into the annular groove 50 in the panel 48.

The thickness of the edge part 40c is slightly greater than the width of the groove 50. Since the second surface skin 40b is formed of a soft material having a shape-retention property, when the edge part 40c is to be inserted into the groove 50, force is applied to the edge part 40c and the edge part 40c is inserted into the groove 50 while the edge part 40c is elastically deformed in the direction of compression of the edge part 40c. The edge part 40c inserted into the groove 50 presses against the side-wall surface of the groove 50 due to elastic restoring force. Therefore, the edge part 40c does not readily fall out of the groove 50. Thus, in the present embodiment, the surface skin 40 is fixed to the panel 48, which serves as a counterpart member integrated with the frame 38, by the edge part 40c of the tip of the surface skin 40 being inserted into the groove 50 provided in the panel 48, which is the counterpart member. Specifically, in the present embodiment, the fixing structure for the surface skin 40 is configured from the groove 50 in the panel 48 and the edge part 40c of the surface skin 40.

Thus, since the surface skin 40 is anchored by inserting the edge part 40c of the surface skin 40 into the groove 50 formed in the panel 48 serving as a counterpart member for fixing the surface skin 40, the need for a plastic hook and a dedicated fitting structure used for fitting with the plastic hook is eliminated; therefore, it is possible to simplify the structure of the fixing structure for a surface skin, reduce the number of components in the fixing structure for a surface skin, and lower the cost of the fixing structure for a surface skin. Additionally, it is possible to fix the surface skin 40 comprising a soft material to the panel 48 merely by performing a very simple operation for inserting the edge part 40c of the surface skin 40 into the groove 50 in the panel 48, which is a counterpart member.

Other Embodiments

Although the present invention was described above by giving preferred embodiments, the present invention is not limited thereto. Various modifications are possible within the scope of the description given in the claims.

For example, in the embodiments described above, the fixing structure for a surface skin according to the present invention is applied in the location in a vehicle seat at which seatbelt passage holes are formed, and in the location in a vehicle seat at which a manipulation unit of a walk-in device is formed. However, the present invention can be applied in locations in the vehicle seat other than those described above; e.g., in any location in the surface skin at which an opening is provided.

Additionally, the fixing structure for a surface skin according to the present invention is not limited to application in a vehicle seat, but rather can be applied in other locations within a vehicle in which a surface skin is used, and in any location in the surface skin at which an opening is provided.

Furthermore, the fixing structure for a surface skin according to the present invention is not limited to application in a vehicle, but rather can be applied in locations in a given product that are intended for use of a surface skin, such locations being any location in the surface skin at which an opening is provided.

REFERENCE SIGNS LIST

1. Vehicle seat, 2. Seat cushion, 3. Seat back, 4. Headrest, 7. Seat cushion frame (skeletal structure), 8. Seat back frame (skeletal structure), 9. Hinge bracket, 10. Headrest frame (skeletal structure), 13. Pad, 14. Surface skin, 14a. First surface skin, 14b. Second surface skin, 14c. Edge part of surface skin, 15. Seatbelt passage hole, 16. Seatbelt, 17. Core (counterpart member), 20. Groove, 21. Bracket, 22. Opening in surface skin, 31. Vehicle seat, 33. Seat back, 33a. Seat back in forward-pushed state, 34. Headrest, 35. Rod, 37. Walk-in device, 38. Frame (skeletal structure), 39. Pad, 40. Surface skin, 40a. First surface skin, 40b. Second surface skin, 40c. Edge part of surface skin, 41. Manipulation unit, 42. Reclining device, 43. Seat adjuster, 46. Manipulation lever, 47a. Control wire, 47b. Control wire, 48. Panel (counterpart member), 49. Elongated hole in panel, 50. Annular groove, 52. Opening in surface skin

The invention claimed is:

1. A fixing structure for a surface skin, the fixing structure being used for fixing to a counterpart member a surface skin having an opening,
   wherein:
   the counterpart member is provided within the surface skin in a fixed state,
   the surface skin in at least a portion in which the opening being formed is formed of a soft material;
   the opening is formed by an edge part of the surface skin;
   a groove is formed in the counterpart member;
   the surface skin is fixed to the counterpart member by the edge part of the surface skin being inserted into the groove;
   the groove is formed in an annular shape along the opening;
   the opening is exposed to an exterior in a state where the surface skin is fixed to the counter art member;
   the soft material has a shape-retention property whereby a prescribed shape is retained in a natural state; and
   the edge art of the surface skin comprises an inwardly bent shape.

2. The fixing structure for a surface skin according to claim 1, wherein the edge part of the surface skin is inserted into the groove while being elastically deformed.

3. The fixing structure for a surface skin according to claim 2, wherein the counterpart member comprises a rigid skeletal structure or a member integrated with the rigid skeletal structure.

4. The fixing structure for a surface skin according to claim 3, wherein the soft material comprise an elastomer, a soft plastic, a molded non-woven fabric, a stitchable synthetic resin, or a combination of these.

5. The fixing structure for a surface skin according to claim 4, wherein the surface skin is thicker at the edge part than in portions other than the edge part.

6. A vehicle seat comprising:
a frame;
a pad supported by the frame;
a surface skin for covering the pad; and
a fixing structure for a surface skin, the fixing structure being used for fixing the surface skin to the frame;
wherein:
the fixing structure for a surface skin comprises the fixing structure for a surface skin according to claim 5; and
the frame comprises the counterpart member.

7. The fixing structure for a surface skin according to claim 1, wherein the counterpart member comprise a rigid skeletal structure or a member integrated with the rigid skeletal structure.

8. The fixing structure for a surface skin according to claim 1, wherein the soft material comprises an elastomer, a soft plastic, a molded non-woven fabric, a stitchable synthetic resin, or a combination of these.

9. The fixing structure for a surface skin according to claim 1, wherein the surface skin is thicker at the edge part than in portions other than the edge part.

10. A vehicle seat comprising:
a frame;
a pad supported by the frame;
a surface skin for covering the pad; and
a fixing structure for a surface skin, the fixing structure being used for fixing the surface skin to the frame,
wherein:
the fixing structure for a surface skin comprises the fixing structure for a surface skin according to claim 1; and
the frame comprises the counterpart member.

11. The fixing structure for a surface skin according to claim 1, wherein the surface skin is fixed to the counterpart member only by inserting the edge part of the surface skin into the groove.

12. The fixing structure for a surface skin according to claim 1, wherein the inwardly bent shape of the edge part of the surface skin is maintained by the shape-retention property of the soft material.

13. The fixing structure for a surface skin according to claim 1, wherein the edge part of the surface skin is exposed to the exterior.

14. The fixing structure for a surface skin according to claim 1, wherein the surface skin is anchored by inserting the edge part of the surface skin into the groove formed in the counterpart member for securing the surface skin.

15. The fixing structure for a surface skin according to claim 1, wherein the opening penetrates through the surface skin and the counterpart member.

16. The fixing structure for a surface skin according to claim 1, wherein the surface skin includes a receiving portion formed by the inwardly bent shape of the edge part,
wherein the counterpart member includes a flange part formed on an outer edge of the groove, and
wherein the flange part fixedly attaches into the receiving portion of the surface skin.

17. The fixing structure for a surface skin according to claim 1, wherein the shape-retention property includes an elastic restoring force such that the edge part inserted into the groove presses against a side-wall surface of the groove due to the elastic restoring force.

18. The fixing structure for a surface skin according to claim 1, wherein the opening penetrates through the surface skin and the counterpart member,
wherein the surface skin includes a receiving portion formed by the inwardly bent shape of the edge part,
wherein the counterpart member includes a flange part formed on an outer edge of the groove, and
wherein the flange part fixedly attaches into the receiving portion of the surface skin.

19. The fixing structure for a surface skin according to claim 1, wherein the surface skin is anchored by inserting the edge part of the surface skin into the groove formed in the counterpart member for securing the surface skin,
wherein the surface skin includes a receiving portion formed by the inwardly bent shape of the edge part,
wherein the counterpart member includes a flange part formed on an outer edge of the groove, and
wherein the flange part fixedly attaches into the receiving portion of the surface skin.

20. The fixing structure for a surface skin according to claim 19, wherein the surface skin is fixed to the counterpart member only by inserting the edge part of the surface skin into the groove.

* * * * *